United States Patent

Suptitz

[11] Patent Number: 6,067,218
[45] Date of Patent: May 23, 2000

[54] ELECTRONIC TRIP DEVICE COMPRISING AT LEAST ONE SETTING DEVICE

[75] Inventor: Eric Suptitz, Grenoble, France

[73] Assignee: Schneider Electric S.A., France

[21] Appl. No.: 08/799,529

[22] Filed: Feb. 13, 1997

Related U.S. Application Data

[63] Continuation of application No. 08/500,208, Jul. 10, 1995, abandoned.

[30] Foreign Application Priority Data

Jul. 18, 1994 [FR] France .................................... 9409068

[51] Int. Cl.[7] ...................................................... H02H 3/02
[52] U.S. Cl. ............................................................... 361/97
[58] Field of Search ................................. 361/44, 47, 89, 361/93–98

[56] References Cited

U.S. PATENT DOCUMENTS 4,481,604 11/1984 Gilham et al. ........................ 364/464
4,809,125 2/1989 Matsko et al. ............................. 361/93

FOREIGN PATENT DOCUMENTS 0595603 5/1994 European Pat. Off. ........ H02H 3/093
2223898 4/1990 United Kingdom ............ H03M 1/22

*Primary Examiner*—Ronald W. Leja
*Attorney, Agent, or Firm*—Parkhurst & Wendel, L.L.P.

[57] ABSTRACT

The trip device comprises a processing unit which gives a tripping order according to the value of the current supplied by current sensors, and to threshold and time delay values defined by setting devices. The setting devices connected to the processing unit comprise multiple contacts. The contacts supply an encoded binary value representative of each position of the setting device. To prevent operating errors between two positions, only one of the contacts changes state between two successive positions. The value supplied by the setting device is the value corresponding to the immediately lower position or to the immediately higher position. The code representative of each position can follow, for example, the order of GRAY encoding.

11 Claims, 3 Drawing Sheets

ELECTRONIC TRIP DEVICE COMPRISING AT LEAST ONE SETTING DEVICE

This is a Continuation of application Ser. No. 08/500,208 filed Jul. 10, 1995, now abandoned.

BACKGROUND OF THE INVENTION

The invention relates to an electronic trip device comprising:

a processing unit connected to current sensors and supplying a tripping order when the current supplied by the sensors exceeds a preset threshold for a preset time, and at least one setting device, with several positions, connected to the processing unit.

State-of-the-art electronic trip devices comprise current sensors, a processing unit and a trip relay enabling the contacts of a circuit breaker to be opened. The processing unit receives signals supplied by the current sensors and can produce a tripping order to operate the relay. The tripping order is produced when the value of the current signals exceeds preset thresholds for preset times. The thresholds, time delays and choice of type of tripping curves can be fixed, or preferably adjustable by means of setting devices connected to the processing unit.

It is well known to use potentiometers or variable resistances to perform adjustments, notably in analog electronic trip devices, but these components are costly and not very reliable. Digital trip devices preferably comprise selector switches with several positions with encoded single contacts or multiple contacts, like encoding thumb-wheels. The inputs and outputs of the selector switches are controlled by logic circuits, for example by a microprocessor. The circuits determine the settings of the thresholds, time delays and/or choice of type of tripping curves according to the positions of the selector switches.

When adjusting the setting of a selector switch, a user used to progressive adjustments with a potentiometer is liable to position the selector switch between two fixed positions. In the case of a single-contact selector switch, the micro-processor can detect an anomaly and set the adjustments to minimum values or to default values. For example, if two positions are detected, it chooses the lower of the two, and if no position can be detected it sets the adjustments to the minimum.

With a multiple-contact selector switch, such as an encoding thumb-wheel, the closings and openings of the selector switch, contacts follow a known binary encoding method using, for example on 8, 10 or 16 positions. The binary encoding is by increasing value and does not enable the circuits of the processing unit to detect wrong or random values produced by intermediate positisons.

SUMMARY OF THE INVENTION

The object of the invention is to achieve an electronic trip device comprising at least one reliable setting device by means of a multiple-contact selector switch.

This object is achieved by the fact that the setting device comprises multiple contacts, connected to the processing unit, supplying a binary code, a single contact changing state between two successive positions of the setting device.

In a preferred embodiment, the setting device comprises at least three contacts.

According to a preferred embodiment, the setting device supplies a binary code representative of each position according to Gray encoding.

The setting device may be a selector switch with axial control or a thumb-wheel with lateral control.

In a development of the preferred embodiment, the contacts of the setting device are engraved on a printed circuit of the processing unit.

BRIEF DESCRIPTION OF THE DRAWINGS

Other advantages and features of the invention will become more clearly apparent from the following description of several embodiments of the invention, given as non-restrictive examples only, and represented in the accompanying drawings in which.

DETAILED DESCRIPTION OF THE PREFERRED EMBODIMENT

Figure 1:
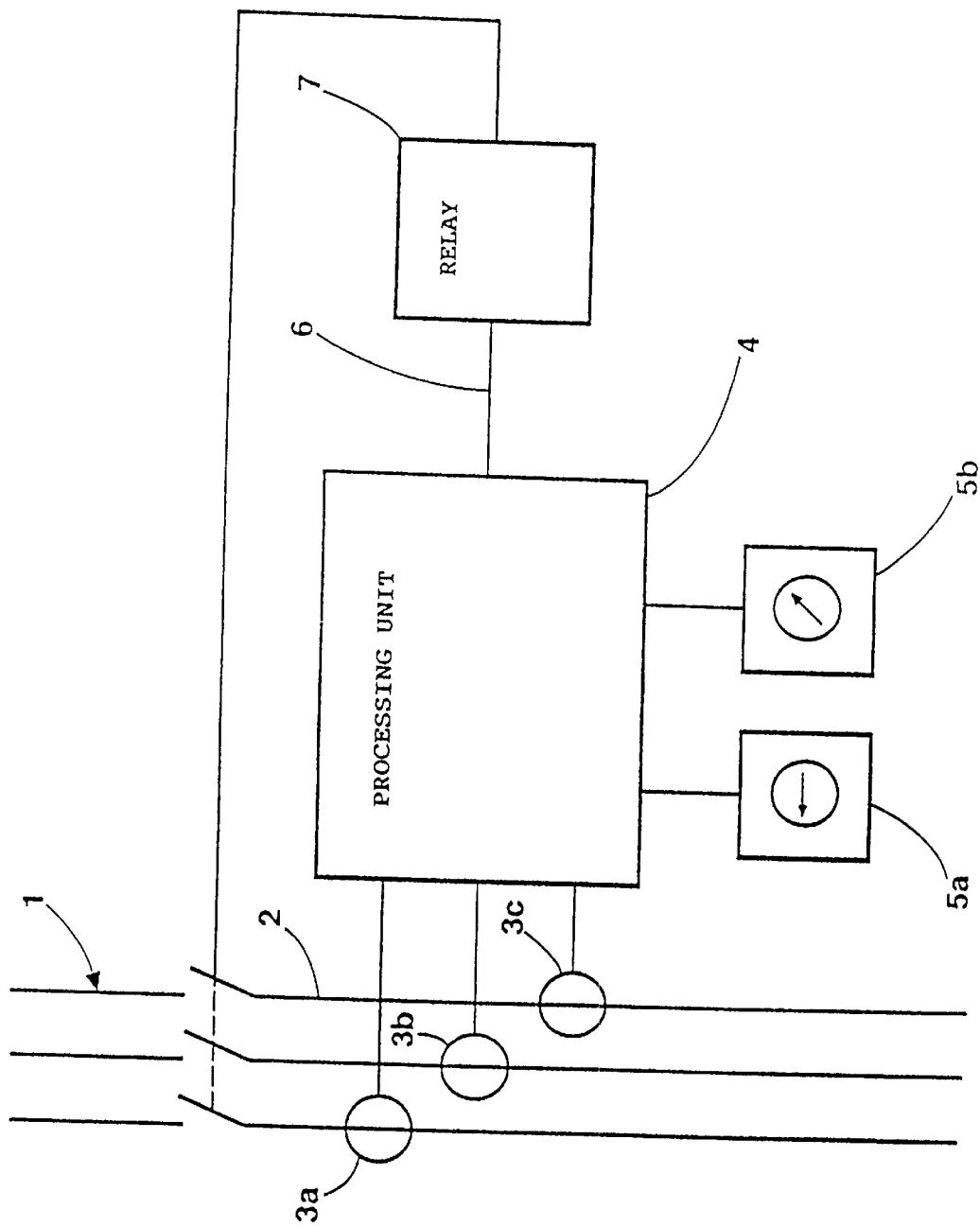
FIG. 1 represents a block diagram of a trip device of known type comprising adjustment means.

FIG. 1 represents the block diagram of a trip device of known type associated to a circuit breaker. The circuit breaker protects a power system 1 composed of electrical conductors. Contacts 2 enable the current in the power system 1 to be established or interrupted. Current sensors 3a, 3b, 3c associated to the power system conductors supply signals representative of the currents flowing in the conductors. The signals representative of the currents are applied to inputs of a processing unit 4. Setting devices 5a and 5b are connected to the processing unit. These devices enable thresholds or time delays to be adjusted or the tripping curves of the processing unit to be chosen. A tripping order 6 produced by the processing unit 4 is applied to the input of a control relay which actuates an opening mechanism of the circuit breaker contacts 2.

The processing unit 4 produces the tripping order 6 depending on the values of the signals supplied by the sensors 3a, 3b, 3c representative of the currents flowing in the conductors of the power system 1, on preset thresholds, time delay values or types of tripping curves. The thresholds, time delays, or types of curves can be fixed or adjustable by means of setting devices 5a, 5b.

The trip device can comprise, in known manner, multiple thresholds, time delays and types of curves. For example, a threshold, a time delay and a type of curve are used for a thermal function, also called long delay. In the long delay function, the type of curve is preferably an $I^2t=C$ type, where $I^2t$ is the squared value of a quantity representative of the current flowing in the conductors of the power system, t represents the time delay between the moment when a fault or an overload occurs and the moment when tripping takes place, and C represents a constant.

In a complex trip device, with multiple settings, the setting devices are also used for other functions, for example, for adjusting the earth fault protections or for load-shedding and reconnection functions.

Figure 2:
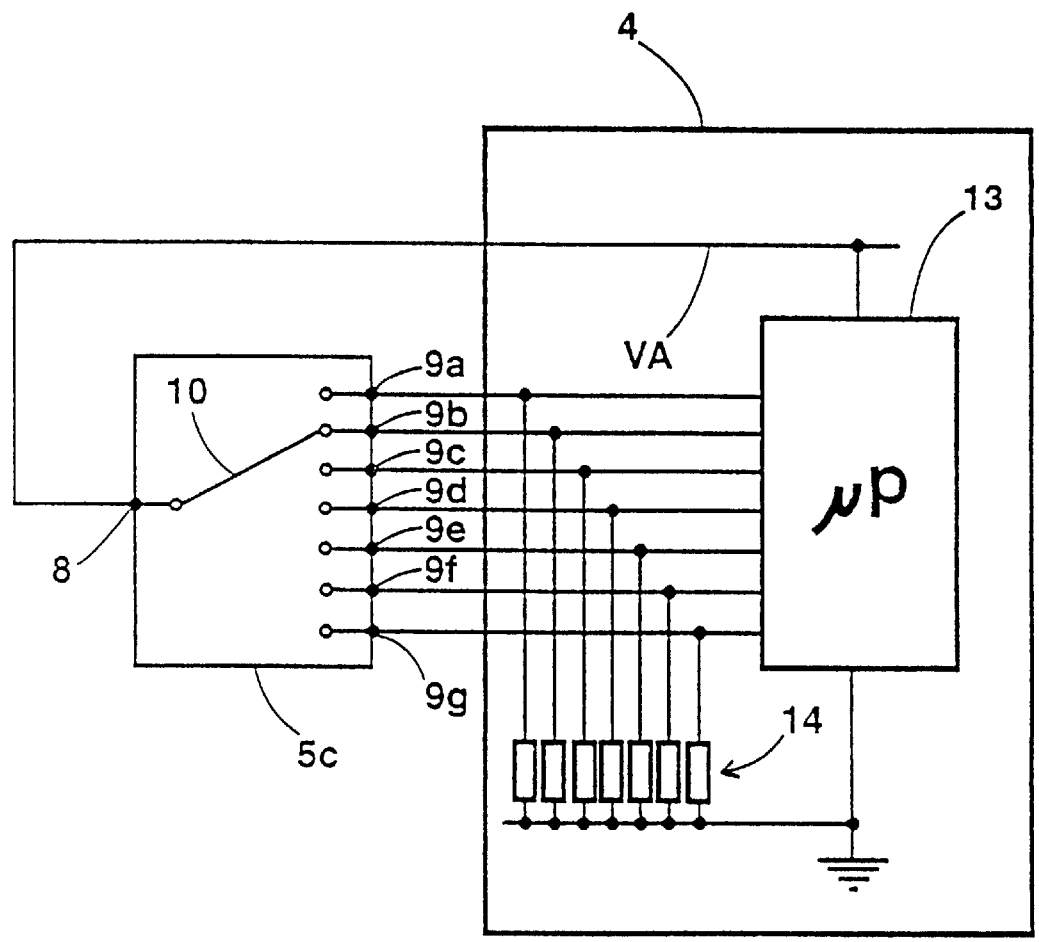
FIG. 2 shows a processing unit and a known setting device with a single-contact selector switch able to form part of the trip device of FIG. 1.

FIG. 2 shows a processing unit 4 and an setting device 5c formed by a single-contact selector switch. The selector switch comprises a common input 8 and outputs 9a to 9g connected to the processing unit 4. The input 8 is connected to a supply voltage VA of the processing unit and the outputs 9a to 9g are connected to inputs of a logic circuit 13. Resistances 14 are connected between each output 9a to 9g and the electrical ground of the processing unit to polarize the outputs of the selector switch and the inputs of the circuit 13. Grounding of the input 8 and polarization of the outputs 9a to 9g with resistances 14 connected to a voltage VA would produce the same results. In normal operation, a contact is established by means of a cursor 10 between the input 8 and one of the outputs only. However, if the cursor 10 is between two positions, it can happen that none of the outputs is connected to the input when the contacts are not overlapping. If the contacts are overlapping two successive outputs can be connected at the same time.

The processing unit reads the outputs 9a to 9g of the selector switch 5c and attributes a value to the corresponding threshold, time delay or type of curve. In the event of an anomaly, due for example to an incorrect position, the processing unit detects the anomaly and attributes a default value, or a minimum value, to preferably privilege safety.

Figure 3:
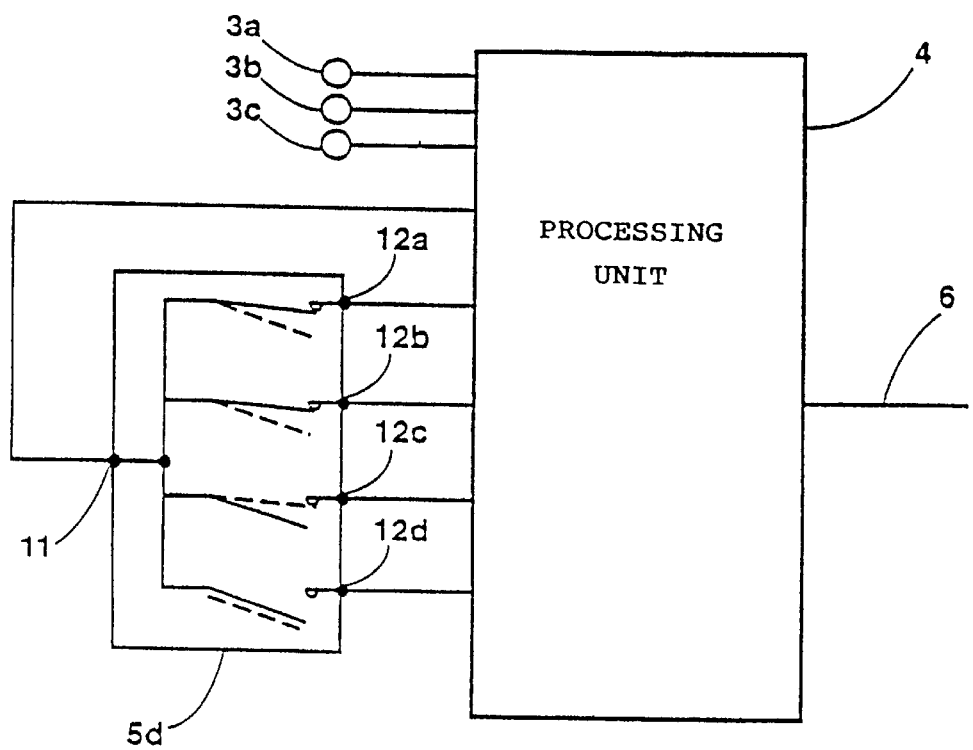
FIG. 3 shows a processing unit and a multiple-contact setting device able to form part of the trip device of FIG. 1.

In the diagram of FIG. 3, the single selector switch is replaced by a selector switch 5d with multiple contacts. The selector switch 5d comprises a common input 11 and four outputs 12a, 12b, 12c and 12d connected to the processing unit. The connection of the input 11 and polarization of the outputs 12a to 12d are of the same type as those of the input 8 and the outputs 9a to 9g of the selector switch 5c. Contacts A, B, C and D connecting the input 11 respectively to the outputs 12a, 12b, 12c and 12d define a code. Generally the open state of a contact is defined by the value 0 and the closed state by the value 1. In the minimum position of the selector switch, the contacts A, B, C, D are open. They supply the processing unit with an encoded binary value 0000 representative of the state of the contacts respectively A, B. C, D. Taking, for example, the contact A representative of the weakest bit and contact D for the strongest bit, a table 1 gives the encoded binary values of a ten-position selector switch 5d.

TABLE 1

| Position | Code |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The increasing positions 0 to 9 give encoded binary values 0000 to 1001. Between certain consecutive positions, several contacts may change state. For example, position 3 corresponds to a code 0011 representive of contacts A and B closed and C and D open, whereas position 4 corresponds to a code 0100 representive of contacts A, B and C open and contact C closed. Between positions 3 and 4, the three contacts A, B and C change state . In FIG. 3 the states of the contacts of position 3 are represented in solid unbroken lines and the states of the contacts of position 4 are represented in broken lines.

If all the contacts do not change state at exactly the same time, an intermediate position, between positions 3 and 4, could give wrong code values, for example 0111, 0000, 0001, 0101, 0110 representative respectively of positions 7, 0, 1, 2, 5, 6 instead of the values 0011 or 0100 of positions 3 and 4.

Random values between two positions cannot be detected by the processing unit and the threshold, time delay or curve type adjustments are liable to be wrong and not correspond to the position of the selector switch.

Figure 4:
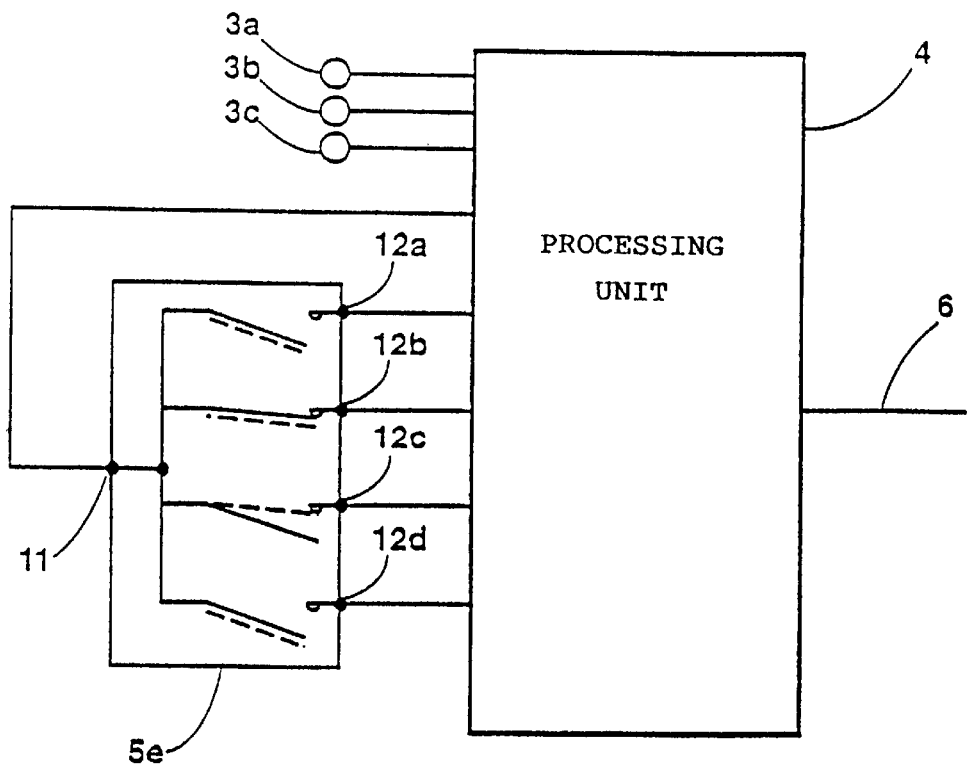
FIG. 4 shows a trip device according to an embodiment of the invention comprising a multiple-contact setting device.

In an embodiment of the invention the multiple-contact selector switch 5d with increasing encoding is replaced by a multiple-contact selector switch 5e having a single contact which changes state between two positions as shown in FIG. 4. The connections of the selector switch 5e to the processing unit are identical to those of the selector switch 5d. Encoding is not increasing and the processing unit attributes the threshold, time delay and curve type values differently from that of increasing encoding.

An example of encoding of the contacts A, B, C, D of the selector switch 5e is represented in table 2.

TABLE 2

| Position | Code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |

With the selector switch 5e, between positions 1 (code 0001) and 2 (code 0011), only contact B changes state whereas with the selector switch 5d contacts A and B changed state (table 1). Between position 3 (code 0010) and 4 (code 0110), wrong values can no longer arise , as only contact C changes state, contacts A and D remain open (value 0) and contact B remains closed (value 1). In an intermediate position, the selector switch 5e will give the code of the immediately lower position or the code of the immediately higher position. For example, in an intermediate position between positions 3 and 4 the selector switch supplies the code of position 3 or that of position 4. In FIG. 4 the states of the contacts of position 3 are represented in solid unbroken lines and the states of the contacts of position 4 are represented in broken lines.

The code supplied by the selector switch 5e can follow the order of GRAY encoding. Table 2 represents the order of the positions of the selector switch in which the corresponding binary code follows the order of GRAY encoding. Contact A corresponds to the lowest bit and contact D to the highest bit.

The multiple-contact setting devices associated to a trip device according to the invention can have various forms. For example, they can be provided with an axial control or a lateral control as for encoding thumb-wheels. They can come in the form of discrete components to be soldered onto a card of the trip device or be integrated and engraved on a printed circuit where conducting tracks form part of the contacts.

According to the diagram of FIG. 4, the input 11 of the selector switch 5e is connected to the processing unit, but it could just as well be connected to a supply voltage or to the electrical ground of the trip device. In the case where a trip device comprises several setting devices, the output signals 12a, 12b, 12c and 12d of the various devices can be multiplexed before being sent to the processing unit.

I claim:

1. In an electronic trip unit generating trip signals responsive to a position device capable of multiple physical positions representing corresponding states of a multiple contact set, wherein the position device is susceptible to erroneous output corresponding to intermediate placement between two successive physical positions, the improvement comprising:

said position device providing a specific binary code representative of each of said physical positions according to the order of Grey code encoding, the specific binary code being supplied to the unit being representative of the physical position corresponding to the placement of the position device, wherein an erroneous placement of the position device between two successive physical positions results in the specific binary code of only one of the immediately successive physical positions being supplied to the unit.

2. The unit of claim 1, wherein the position device is a selector with axial control.

3. The unit of claim 1, wherein the position device provides the unit with a value representative of a thermal function threshold.

4. The unit of claim 1, wherein the position device provides the unit with a value representative of a selected type of tripping curve.

5. An electronic trip device, comprising:

a processing unit connected to current sensors and designating a tripping order when current supplied by the sensors exceeds a preset threshold for a preset time; and at least one setting device electrically connected to said processing unit having a plurality of physical positions, each of said physical positions corresponding, respectively, to one state of a multiple contact set, the setting device configured to (i) assign a specific binary code to each of said physical positions, and (ii) supply for an intermediate position between two successive physical positions the specific binary code corresponding to only one of the immediately successive physical positions, wherein said processing unit is supplied at any given time with a binary code corresponding to only one of said physical positions or intermediate position of said setting device, whereby placement of said setting device in said intermediate position between two successive physical positions results in one specific binary code corresponding to only one of the immediately successive physical positions being supplied to said processing unit.

6. The device of claim 5, wherein said setting device is a selector with axial control.

7. The device of claim 5, wherein said setting device provides the processing unit with a value representative of a thermal function threshold.

8. the device of claim 5, wherein said setting device provides said processing unit with a value representative of a tripping curve.

9. The device of claim 5, wherein said setting device is configured to assign the binary code for each of said physical positions according to the order of Grey code encoding.

10. In an electronic trip unit having a processing unit and at least one setting device, the processing unit connecting to current sensors and designating a tripping order when current supplied by the sensors exceeds a preset threshold for a preset time, the setting device having several physical positions, each physical position corresponding to one state of a multiple contact set, a processing unit-implemented method of assigning a non-random binary code to physical positions of the setting device including an intermediate position between two successive physical positions, the method comprising the steps of:

assigning one specific binary code to each physical position;

supplying for the intermediate position between two successive physical positions the specific binary code of only one of the immediately successive physical positions;

measuring only one physical position or one intermediate position of the setting device at a time; and supplying the one specific binary code assigned to the one physical position or one intermediate position to the processing unit.

11. The processing-unit implemented method of claim 10, wherein supplying of the one specific binary code of only one of the immediately successive physical positions to the intermediate position between two successive physical positions is based on encoding each physical position using the order of Grey code encoding.

* * * * *